Oct. 18, 1949.  E. McCORMICK  2,485,057
CULTIVATING ROLLER
Filed May 26, 1945
FIG. 1.
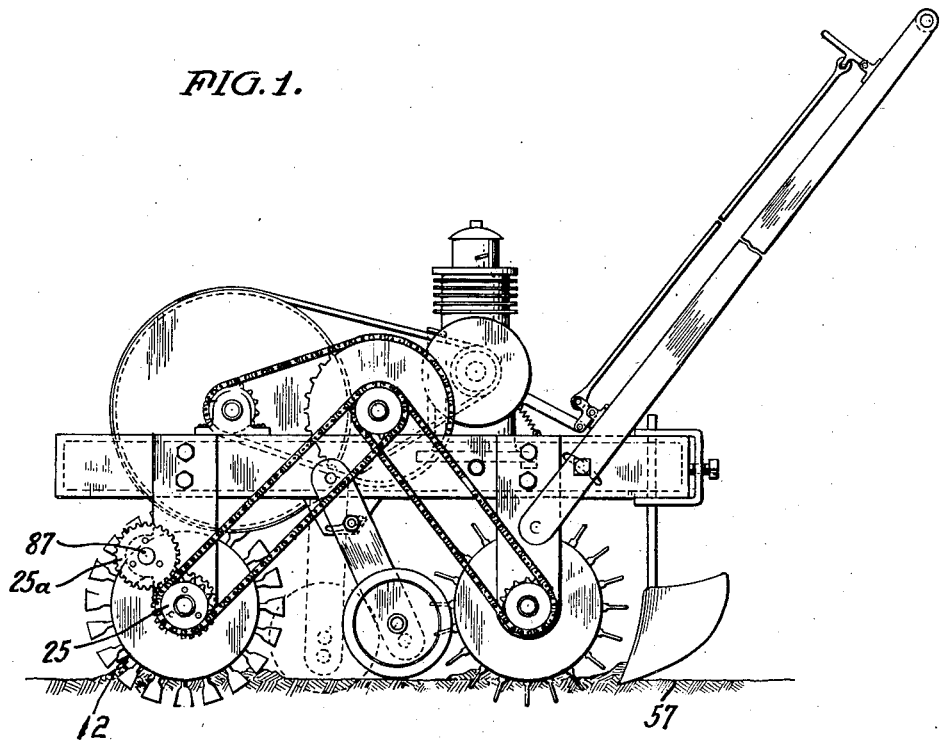
FIG. 2.
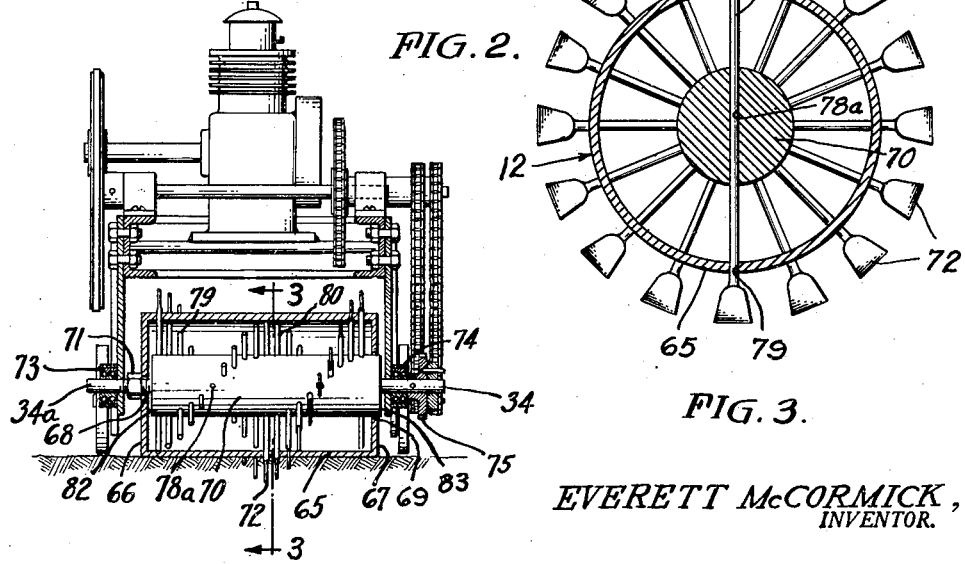
FIG. 3.
EVERETT McCORMICK,
INVENTOR.
BY
ATTORNEY Patented Oct. 18, 1949

2,485,057

UNITED STATES PATENT OFFICE 2,485,057

CULTIVATING ROLLER

Everett McCormick, Whittier, Calif.

Application May 26, 1945, Serial No. 595,951

1 Claim. (Cl. 97—215)

My invention relates to garden tractors, and more particularly to a garden tractor having a driving drum and a driven or cultivating drum which may be driven in a forward direction in cooperation with the driving drum or in a reverse direction to the driving drum, and when driven in said reverse direction may operate in the manner of a driving wheel to reverse the direction of motion of the tractor.

Garden tractors ordinarily operate in a single forward direction even when they are equipped, as is sometimes the case, with a reversely driven cultivating drum. Many times a given area of ground requires more than one cultivating operation and the tractors now available must circle about to make a second trip over the same area in a forward direction, which is a time consuming, inconvenient and wasteful procedure.

I have developed a garden tractor of the walking type which may be reversed at will through utilization of the cultivating drum as the reversing medium.

I have also developed and applied a novel drum which has unique and improved cultivating features, tool retaining features, and a generally unique and useful relationship with the operative mechanism of the tractor in a manner hereinafter to be described.

Another object of my invention is to provide a novel type of drum structure associated with a garden tractor by virtue of which one or more cultivating tools may be replaced or interchanged.

A still further object of my invention is to provide a garden tractor having a novel interrelationship and interchangeability between the driving elements and the cultivating elements thereof, including means by which additional cultivating elements may be added.

A still further object of my invention is to provide a drum construction in a garden tractor by means of which any desired number or types of cultivating tools may be projected radially beyond the drum and the inner ends of said tools suitably gripped within the drum with or without being supported against a diametrically opposite portion of the drum, whereby said tools may be extended for adjustment or to compensate for wear.

Other objects and advantages will appear and be brought out more fully from the following description considered with reference to the accompanying drawings throughout which like parts are designated by like numerals.

In the drawings:

Figure 1 is a side elevational view of a garden tractor embodying my improved ground roller.

Figure 2 is a sectional elevational view of my tractor taken on the line 2—2 of Figure 1.

Figure 3 is a sectional view taken on line 3—3 of Figure 2.

My invention relates to an improved ground roller to be used in connection with tractors. Its use is probably more extensive, but it will be hereinafter explained in connection with a garden tractor of the variety shown in the drawings. The description and specifications hereinafter to follow will, however, be confined to the details of my improved roller.

My novel roller and grouser assembly comprises the forward roller 12 having an outer roller shell 65 and ends 66 and 67 provided with axial holes 68 and 69 through which pass axles 34 and 34a and the sleeve 70, respectively. By means of a nut 71 threaded on the shaft 34a, the end 66 of the roller provides a thrust against which the sleeve 70 may be moved axially within forward roller 12 for tightening and securing grousers 72 in place as hereinafter more fully described. The axles 34 and 34a may be rotatably mounted in ball bearings 73 and 74 which are secured to the frame of the tractor. Keyed to the axle 34 I provide a fixed sprocket 75 for rotating the roller 12 by means of a suitable drive chain.

Axle 34 is fixedly secured to the sleeve 70, as, for example, by welding. The hole 69 may be large enough to slidably receive the end of the sleeve 70 and the hole or bore 68 is sufficiently large to slidably receive the axle 34. Through the sleeve 70 I provide a suitable number of diametrical bores 78a which are aligned with similarly disposed bores 79 in the shell 65. Thus, the grousers 72 may be individually extensible through the shell 65 by virtue of the bores 79 and also through bores 78a in the sleeve 70 until the inner ends 80 of the grousers may rest upon the opposite wall of the shell 65. The grousers 72 may be clamped in place by tightening upon the nut 71 which causes a relative shifting of the sleeve 70 within the shell 65 thereby gripping or clamping the grousers 72 in the position in which they have been set. Said drum 12 may, but need not, provide a substantial clearance around said sleeve 70. The sleeve 70 may comprise a solid bar or may be fitted with ends 82 and 83 welded to the ends of the sleeve 70 and to the axles 34a and 34, which, in either case, may extend as a continuous unit from bearing 73 to bearing 74, or may comprise right and left extreme sections or segments the inner ends of which are welded to the sleeve 70.

If it be desirable to change, replace, or alter the extension of the grousers 72 or the driving spikes 81 the nut 71 may be loosened from its engagement against the end 68, for example, of the forward roller. The sleeve 70 will no longer bind upon the inner portion of the grousers 72 and said grousers may be removed, interchanged or extended to any desirable extent, individually or collectively. Said grousers may then be tightened in their desired position of extension merely by tightening the nut 71 whereby the sleeve 70 is shifted axially within the roller 12 to clamp the grousers in position.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices.

Having described my invention, what I claim as new and desire to secure by Letters Patent is:

In a device of the character described, a ground engaging roller provided with a sleeve, said sleeve and said roller having complementary holes receiving the stems of ground engaging tools, said stems being clamped in position within said holes by the relative axial movement of said sleeve and said roller, and means securing said sleeve in a position of axial extension relative to said roller.

EVERETT McCORMICK.

REFERENCES CITED

The following references are of record in the file of this patent:

UNITED STATES PATENTS

| Number | Name | Date |
|---|---|---|
| 949,686 | Redmond | Feb. 15, 1910 |
| 1,301,043 | Dougherty | Apr. 15, 1919 |
| 1,316,359 | Decker | Sept. 16, 1919 |
| 1,333,543 | Greene | Mar. 9, 1920 |
| 1,486,548 | Schrum | Mar. 11, 1924 |
| 1,509,652 | Johnson | Sept. 23, 1924 |
| 2,045,376 | Stanelle | June 23, 1936 |
| 2,244,099 | Chase | June 3, 1941 |

FOREIGN PATENTS

| Number | Country | Date |
|---|---|---|
| 298,119 | Great Britain | Oct. 11, 1928 |